Patented Apr. 25, 1944

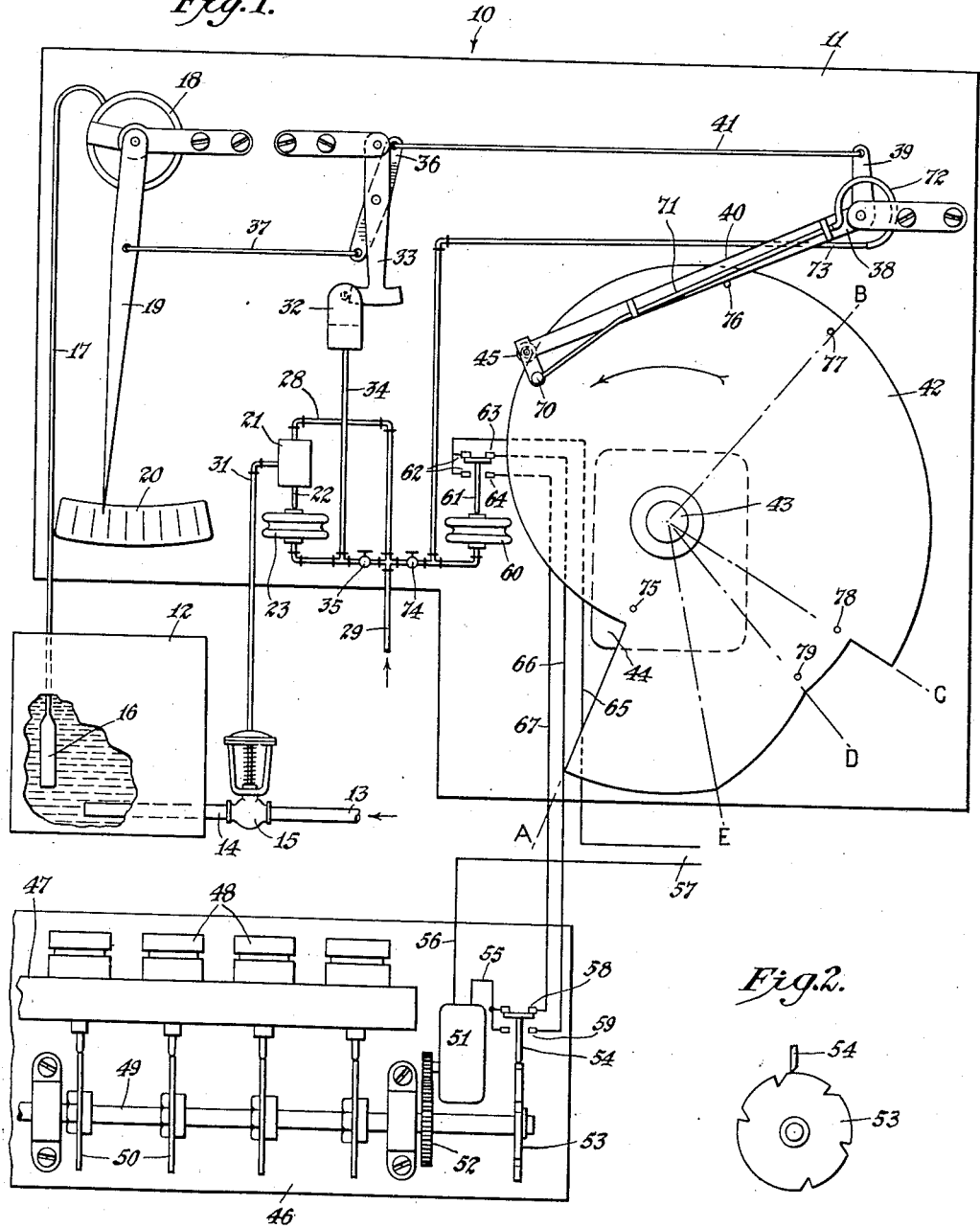

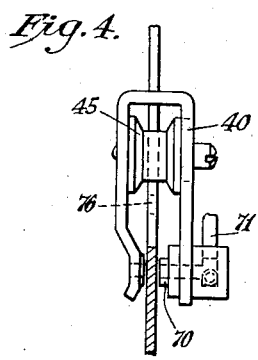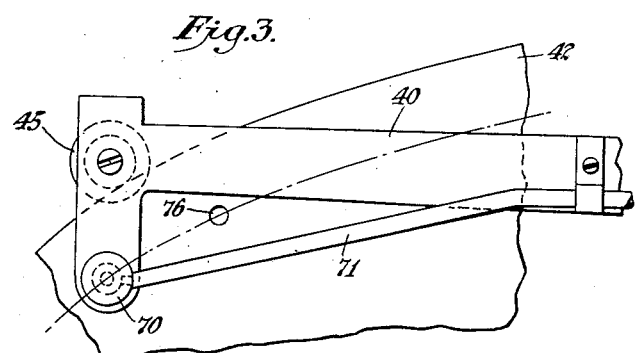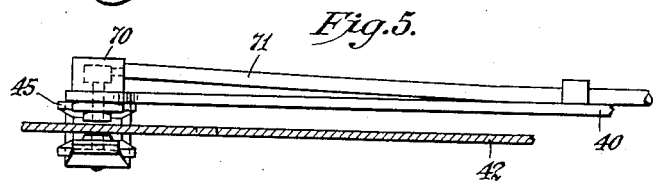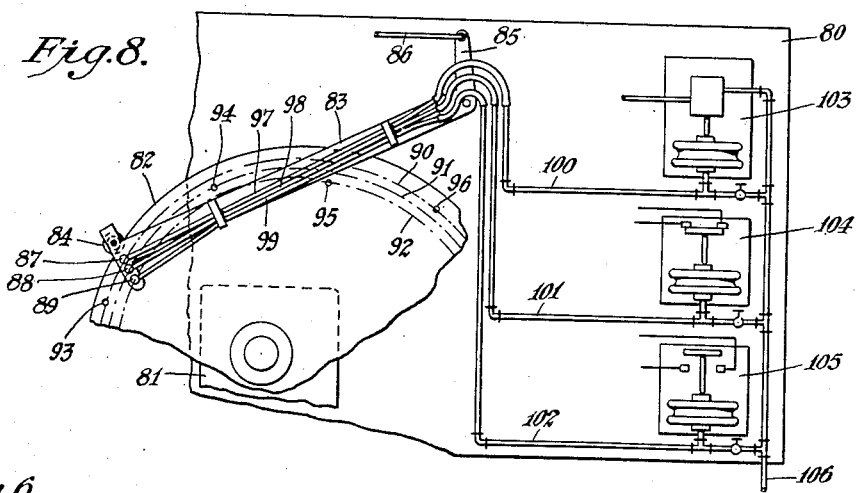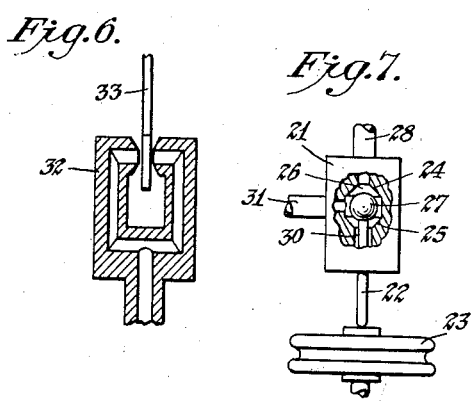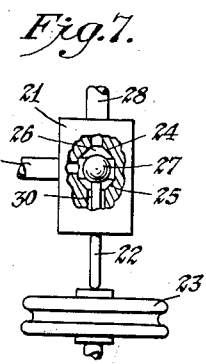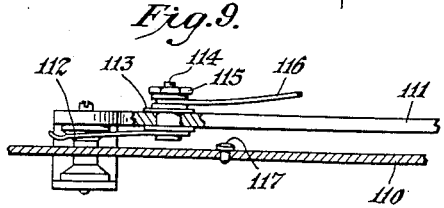

2,347,344

UNITED STATES PATENT OFFICE 2,347,344

CONTROLLING INSTRUMENT

James R. Waidelich, Naugatuck, Conn., assignor to The Bristol Company, Waterbury, Conn., a corporation of Connecticut Application August 16, 1941, Serial No. 407,144

15 Claims. (Cl. 161—1)

This invention relates to controlling instruments, and more especially to a controller for regulating the magnitude of a variable and coordinating therewith a predetermined sequence of operations essential to a process. In the automatic control of an industrial process, it is frequently necessary to regulate the value of a variable, such as temperature, to a predetermined magnitude for a given interval of time, and then to change the setting of the control point to another value; or it may be necessary to cause the setting of said magnitude to be varied continuously through a series of predetermined values over a predetermined interval of time. Such automatic adjustment of a control point is frequently termed, and is hereinafter designated, "progressive" control. It is also often desirable that during the process there be initiated a number of more or less abrupt or intermittent events in which is involved the event of timing without specific reference to magnitude, such action being commonly known as "sequence" control.

It is an object of the present invention to provide means for coordinating the above two functions of control in a single instrument.

It is a further object of this invention to provide means whereby the two forms of control can be carried out in coordinated relation and without mutual interference.

It is a further object to provide in an instrument of the class described means whereby the function of sequence control can be effected on individual members of a plurality of controlled units in desired relation to the progressive control.

It is a further object to provide means whereby the whole cycle of events and values to be attained by variables can be set up in advance on a single controlling member adapted to be readily applied to the controlling device and readily replaced by another similar member incorporating a different cycle.

It is proposed to provide for the purposes in view an instrument adapted to control a variable to a predetermined magnitude, and to incorporate in the same a cam element having its periphery conformed to a predetermined contour, whereby a cam follower coacting with said periphery may be caused to vary said magnitude through a succession of predetermined values. It is proposed, moreover, to incorporate in said cam follower a control couple which, through the escape of air or other elastic fluid, as governed by cooperating apertures in the body of the cam element, or through electrically or mechanically cooperating elements, may be caused to actuate further controlling devices or instruments.

In the drawings, Fig. 1 is a diagrammatic representation of control instrumentalities embodying the principles of the invention. Fig. 2 is an end elevation of a detail of the above. Figs. 3, 4 and 5, respectively, are side, end and bottom elevations, partly in section, of other elements of the control apparatus. Figs. 6 and 7 illustrate partly in section further elements of the control apparatus. Figs. 8 and 9 are representations of alternative forms of the control apparatus.

Referring now to the drawings: The numeral 10 represents an instrument embodying the essential elements of the invention, and including a base-plate 11 upon which said elements are operatively mounted. A tank 12 is adapted to contain a body of liquid whose temperature is to be controlled by the admission of a regulated flow of steam or other heating agent from a source 13 through a conduit 14 as regulated by a pneumatically operated valve 15. The temperature of the liquid within the tank 12 is determined by means of a bulb 16, containing an expansive or volatile fluid such as xylene, and communicating through a capillary tube 17 with a Bourdon spring 18, operatively attached to a pointer or index 19, which is pivotally mounted upon the base-plate 11. A graduated scale 20, cooperating with the index 19, provides an indication of the deflected position of said index and thus of the pressure within the Bourdon spring 18, and therefore, of the temperature within the tank 12 as communicated to the bulb 16 and the volatile fluid contained therein.

Regulation of the valve 15 is effected through a pilot valve 21, having a stem 22 adapted for operation by a capsular spring or bellows 23 according to the pressure of the fluid contained within said bellows. The pilot valve 21 (for which no invention is herein claimed) is shown in Fig. 7. Within the body of the valve are two oppositely directed seats 24 and 25, together defining an interior space 26, and adapted to be alternatively engaged by a seating member 27, which takes the form of a ball engaged by the stem 22. The seating member 27 in cooperation with the seat 24 serves to control communication between the space 26 and a conduit 28 connected to a supply 29 of air or other elastic fluid. The seating member in cooperation with the seat 25 serves to control communication between the space 26 and an annular passageway 30 freely surrounding the stem 22 and leading to the external atmosphere. A conduit 31 provides communication between the internal space 26 and the diaphragm-motor element of the control valve 15. It will be seen that the seating member will be positioned with respect to the two seats 24 and 25 according to the degree of inflation of the capsular spring 23, and that there is thus provided a delicate control of the pressure of air from the source 29 applied to the valve 15, and therefore, of the degree of opening of said last-named valve. An orifice member 32 (shown in section in Fig. 6) includes two opposing jets or orifices through which air or other elastic fluid may be bled to the atmosphere. A vane member 33 pivotally mounted upon the base 11 is adapted to swing through a limited angle and to pass between the jets or orifices of the member 32, thereby more or less obstructing the escape of air therefrom. The orifice member 32 is connected to the interior of the bellows 23 by means of a conduit 34, and the system so formed receives air from the source 29 through a constriction 35. A differential lever 36, having pivot points of attachment at its extremities and a further pivot point of attachment intermediate the same is pivotally mounted at said last-named point upon the vane member 33 at a location removed from the axis of rotation of the latter. One of the extreme pivot points on the lever 36 is attached by means of a link 37 to the pointer or index 19, whereby said last-named pivot point will partake of movement imparted to said pointer.

Pivotally mounted upon the base-plate 11 and adapted for rotation through a limited angle is a bell-crank member 38 having a short arm 39 and a long arm 40. The free pivot point on the lever 36 is attached to the arm 39 by means of a link 41.

The combination as thus far described is substantially equivalent to the control apparatus set forth and described in U. S. Letters-Patent No. 2,000,739, issued to applicant's assignee May 7, 1935. Changes in temperature of the liquid within the tank 12 will effect variations in pressure of the volatile fluid in the bulb 16, which variations will be transmitted through the capillary tube 17 to the Bourdon spring 18, causing the position of the pointer 19 to be affected. Assuming the bell-crank 38 to be held stationary, movement of the pointer 19 will be communicated through the link 37 and the lever 36 to the vane 33. The vane 33 coacting with the orifice member 32 to affect the escape of air therefrom will cause the pressure of said air as restricted by passage through the constriction 35 to be varied and will thereby affect the pressure within the bellows 23 and the setting of the valve 21. This, in turn, will control the pressure communicated through the conduit 31 to the motor element of valve 15, and thereby effect regulation of the admission of heating agent through the conduit 14 to the tank 12 in a sense to compensate for the temperature variations by which control action was initiated.

It will further be apparent that, should the bell-crank member 38 be deflected about its axis of rotation, the movement will be communicated through the link 41 to the lever 36, thereby changing the setting of the control mechanism and the value toward which the apparatus will tend to control the temperature of the liquid in tank 12.

The feature of "progressive" control is effected by the use of a cam 42 removably mounted upon a spindle 43 and rotated therewith by means of a constant speed motor or clock element 44, and having a conformed contour adapted to move the arm 40 in accordance with the shape of said contour, and thereby to vary the controller setting according to a predetermined schedule. The extended arm 40 carries upon its extremity a follower in the form of a small roller 45, adapted to rest upon the contour of the cam 42, whereby friction between the cam and the mechanism driven thereby is reduced to a minimum. The cam shown in the drawings is illustrated as having a form adaptable to use in connection with a dyeing operation, and is shown as such solely by way of example. The contour may be analyzed as follows:

The normal position of rest of the cam is that in which the roller 45 is in engagement with the point defined by the intersection of radius A with the contour of the cam. The cam is assumed to be subject to rotation in a counterclockwise sense as shown by the arrow in the diagram. The angle of rotation extending from radius A to radius B is subtended by a portion of the contour having a spiral conformation, so that as the cam rotates through this angle, the arm 40 is gradually elevated from the minimum radius corresponding to A to a maximum radius corresponding to B; and under normal operating conditions the temperature of the liquid in the tank 12 will thereby be automatically regulated according to a time-temperature curve corresponding to the constantly increasing radius of the cam. From the radius B to the radius C of the cam the contour is of uniform diameter; and during the time represented by rotation of the cam through the angle between these radii the temperature would be regulated to a constant value. As the radius C passes the roller 45 the arm 40 will drop to an intermediate position, with the result that the temperature will be regulated to a lower value, which will hold constant until the radius D reaches the roller 45. The portion of the cam follower between radii D and E is again an increasing spiral, so that during this part of the rotation of the cam the temperature will be increased to its original maximum value. The temperature will then be held constant during the remainder of the rotation of the cam, while the roller 45 passes from engagement with the contour at the end of radius E until it reaches radius A, where it abruptly drops to the original low temperature setting and causes the temperature to be rapidly lowered to that value. The arm 40 and roller 45 may, of course, be moved from the higher to the lower portions of the cam periphery under the action of gravity or, if desired, by a spring, as will be readily understood. No novelty is claimed for the "progressive" control thus effected by cooperation of the arm 40 and the roller 45 with the more or less irregular contour of the cam 42.

The function of sequence control is carried out on a principle basically similar to that of the instrument fully set forth and described in the copending application of Harold E. Allen, Serial No. 375,097, filed January 21, 1941. Mounted upon a base plate 46 is a manifold 47 carrying a plurality of pilot valves 48, adapted to receive air or other elastic fluid from cavities within said manifold and to distribute the same to pneumatically actuated motor devices to be controlled. Journaled upon the plate 46 is a cam shaft 49 carrying a plurality of cam elements 50 adapted to engage the respective valves 48 and to operate the same according to a sequence predetermined by the shaping of the contours of said cam elements. An electric motor 51 also mounted upon the plate 46 is adapted to drive the cam shaft 49 and cams carried thereby through a gear train 52. A cam member 53 mounted upon the shaft 49 operatively engages a double-throw electric switch 54, having its "common" contacts connected to one terminal of the motor 51 by means of a conductor 55. The other terminal of motor 51 is connected through a conductor 56 to a suitable source of electric power supply 57. Contacts 58 and 59 on the switch 54 are adapted to be alternatively connected to the common contacts and thereby to the conductor 55, according to the engagement of the switch 54 with the cam 53. As shown in Fig. 2, the cam 53 has a plurality of indentations, so proportioned that when the switch 54 engages the periphery of the cam the contact 58 of the switch will be connected to the common contact and thereby to the conductor 55, and when the switch engages any one of the indentations on the cam 53 the contact 59 will be electrically connected to the conductor 55.

Mounted upon the base-plate 11 of the instrument 10 is a bellows member or capsular spring 60, arranged to operate a double-throw switch 61 in a sense that when fluid pressure exists within said bellows electrical connection will be provided between a common contact 62 and a contact 63, and when the interior of said bellows is at relatively reduced pressure, connection will be provided between contact 62 and a contact 64. The common contact 62 is connected by a conductor 65 to the free side of the electric source 57. Contact 63 is connected by a conductor 66 to contact 59 of switch 54; and contact 64 is connected by a conductor 67 to contact 58 of switch 54.

Carried by the arm 40 is a jet member 70 juxtaposed to the surface of the cam 42, a short distance within its periphery, and in such a sense that the material of the cam normally affords obstruction to the escape of air from said jet member. A conduit 71 carried by the arm 40 extends from the jet member 70 to a point near the axis of rotation of the bell-crank member 38. A flexible section 72 of rubber tubing or the like provides connection between the conduit 71 and a stationary conduit 73 fixed to the base-plate 11 and in free communication with the interior of the bellows 60. The system including jet 70, conduits 71 and 73, and bellows 60, is adapted to receive air from the source 29 through a constriction 74. For the purpose of operating the switch 61 there are provided perforations as 75, 76, 77, 78, and 79 pierced through the material of the cam at predetermined angular locations, and so disposed with respect to the periphery that as the cam member 42 carries out its rotation, they will successively pass under the jet member 70 and momentarily leave the same unobstructed. It will be seen that while the material of the cam obstructs the bleeding of air from the orifice 70, there will be built up in the bellows 60 a definite pressure tending to maintain contacts 62 and 63 in electrical engagement. As any one of the openings 75, 76, etc., passes the jet 70 the pressure in the bellows 60 will be momentarily lowered, and contacts 62 and 64 brought into engagement, this condition existing only during the short interval required for the opening to pass the jet 70. The jet 70 has been shown as illustrated, particularly in Figures 3, 4, and 5, as being juxtaposed to one side only of the cam 42. In view of the considerable amount of power available from the motor 44 for rotating said cam, the slight loading so introduced is not objectionable; but, should it prove desirable to reduce this loading to a minimum, it is quite practicable to substitute for the jet 70 an orifice member of the double-opposed type, as shown in Fig. 6 and hereinbefore fully described.

The operation of the sequence control element of the device is as follows:

Consideration may first be given to the elements of the mechanism in the position as shown in Fig. 1, where the arm 40 attained a position intermediate the radii A and B. Under this condition the jet 70 will be obstructed by the material of the cam, and pressure will exist in the bellows 60, maintaining contacts 62 and 63 in engagement and causing contacts 62 and 64 to be separated. The cam shaft 49 of the sequence control instrument will be resting in position with the switch 54 on the outer periphery of the cam 53, thus maintaining contact 58 in electrical connection with the conductor 55 and the contact 59 open-circuited. The circuit to motor 51 thus being incomplete, said motor will remain at rest, causing conditions controlled by the valves 48 to be maintained undisturbed. As rotation of the cam 42 continues, the opening 76 will eventually come into engagement with the jet 70, allowing the air to escape freely from said jet and the pressure in the bellows 60 to be lowered, opening contact 63 and causing contacts 64 and 62 to be brought into engagement. This will complete a circuit through the lower contacts of switch 61 and the upper contacts of switch 54, causing the motor 51 to be energized and to rotate the cam shaft 49. This will continue until the switch 54 engages the first of the indentations on the cam 53, and drops to its lower position whereupon the motor circuit through the upper contacts of switch 54 will be interrupted, and the contact 59 connected to the conductor 55. The motor will be de-energized and will come to rest, this operation taking place while the opening 76 is still under the jet 70; but as the opening 76 passes out of the range of the jet 70, pressure will again be built up in the bellows 60, causing contacts 62 and 63 to be brought into engagement, and thus completing the circuit of the motor through conductor 66. The motor 51 will again be energized, and will advance the cam shaft 49 until the switch 54 climbs out of the indentation in the cam and again rests upon the outer periphery, thus opening the contact 59 and bringing the motor to rest.

The settings of the cams 50 are made such that each time the switch 54 attains the periphery of the cam 53 and the cam shaft 49 assumes a new position, suitable valves 48 of the group under control will be actuated in a manner to effect a desired operation in the cycle. Thus, for example, assuming a dyeing process to be under control, a typical cycle might include a gradual rise of temperature over an extended period as represented by an angle between radii A and B; and, as the termination of that period is approached, as represented by the perforation 76, a signal is required, or the operation of some automatic device is necessary, to add coloring material to the solution. This would be effected by one of the valves 48 in the sequence instrument in response to the corresponding one of the cams 50 being advanced in consequence to the perforation 76 having engaged, and subsequently passed beyond, the jet 70. The rise of temperature would continue until the radius B had been reached, which may be assumed as corresponding to the boiling point of the liquid. At this time, through the action of the perforation 77, the sequence instrument is caused to set up a condition giving a signal that the "boil" period has commenced. This would continue for a predetermined time until the radius C is reached, and the temperature temporarily reduced to a lower value. At this time the perforation 78 would become active, and would cause the cam shaft 49 in the sequence instrument to be advanced to a position giving a signal to the operator to sample his material. A short time for sampling is represented by the angle between radii C and D; and, as the perforation 79, located on the latter radius, actuates the sequence controller, a signal is given that the sampling period has expired, and that the final boiling period is about to be initiated. The temperature would then rise as hereinabove set forth until a final value is attained as represented by the position of the radius E; and this would continue until the end of the cycle. Upon the radius A coming into engagement with the arm 40, and the temperature being rapidly lowered, the perforation 75 pierced on this radius would engage the jet 70, advancing the cam shaft 49 and mechanism actuated thereby to a position signaling the termination of the cycle.

In Fig. 8 is shown one of the many possible modifications of the invention, and illustrating the flexibility with which its principles may be applied to a diversity of purposes in automatic control. Rotatably mounted upon a base-plate 80, and adapted to be driven by a clock or constant speed motor 81, is a cam member 82, having a spirally conformed contour representing the values to be attained by a temperature or other variable under control. An extended arm 83, having a cam follower or roller 84 adapted to ride upon the periphery of the cam 82, forms a part of a bellcrank element pivotally mounted upon the base 80 and having an arm 85 connected by a link 86 to control mechanism (not shown in the drawings, but similar in all respects to that illustrated in Fig. 1) for regulating values of a variable. Carried by the arm 83 are three jet members 87, 88 and 89 juxtaposed to the surface of the cam member 82 in a manner similar to that of the jet member 70 with respect to the cam member 42 in the previously described embodiment. The jet members 87, 88 and 89 are disposed so as to lie at different radial distances from the center of rotation of the cam 82, their respective paths of travel with respect to the cam being as illustrated by the curves 90, 91, and 92. Perforations, as 93, 94, 95, and 96, pierced through the material of the cam on the several curved paths at angular positions corresponding to the times required for the initiation of events, will provide for the venting of air from the several jets, according to which of the curved paths a particular perforation lies upon. Suitable conduits 97, 98, and 99 carried by the arm 83, and including flexible parts for connection to corresponding stationary conduits 100, 101, and 102, provide connection between the jets and elements responsive to changes in pneumatic pressure.

While the pressure responsive elements may take various forms, and may include one or more sequence control units, these elements are here shown, for purposes of example only, as including a relay valve 103, operable from the jet 87 through the conduits 97 and 100, a direct-acting switch 104, operable from the jet 88, and a reverse-acting switch 105, operable from the jet 89. These several responsive elements include each a bellows member adapted to receive air or other pressure fluid through a suitable constriction from a source 106. The operation of these devices will be obvious from the description hereinbefore given of the pneumatic relay mechanism included in the embodiment shown in Fig. 1; and the control units may be utilized for operating valves, switches, motors, or for any other desired purpose.

As previously noted, the curves 90, 91, 92, represent the positions of the respective jet members 87, 88, and 89 with relation to the cam 82 during rotation of the latter; said curves being thus substantially parallel to the curved periphery of said cam. Similarly, the openings 75—79 in Fig. 1 are arranged on a curved line substantially parallel to the curved periphery of the adjacent portions of cam 42 and corresponding to the positions of the jet member 70 during the rotation of said cam so that said openings will come opposite said jet member during said rotation.

In Fig. 9 is shown a further alternative form of the invention, this being illustrated as applied to the elements of mechanism shown especially in Figures 3, 4, and 5. While the initiating of the sequence control by pneumatic means as hereinbefore described, presents certain advantages, and is accordingly preferred, the invention in its broader aspects is not limited to the employment of pneumatic means for initiating said sequence control and includes electrical means, for example, in lieu of pneumatic means. In Fig. 9, a cam member 110 and a follower arm 111 are interrelated to coact in a manner identical with the corresponding members 42 and 40 in the previous figures. The jet element characterizing the pneumatically actuated sequence control is herein replaced by a flexible brush 112, insulated with respect to the arm 111 and supported therefrom by any suitable means such as an insulating mounting 113, bolt 114, and nut 115, clamping the brush securely into place on the arm 111 and in electrical connection with a conductor 116 adapted to form a part of an electrical circuit. Instead of the cam being pierced with an opening as in the pneumatic form of the invention, it is fitted with a projecting portion 117 of conducting material, which may be a rivet or a screw located in a predetermined position at the time of laying out the cycle. The cam 110 is connected by means of its shaft to an electrical circuit (not shown in the drawings) whereby, in cooperation with the conductor 116, an electromagnet, a relay, a motor, or other electrical device may be made operatively subject to coaction between the projection 117 and the brush 112. Other methods for rendering an electrical circuit directly responsive to the position of one or more actuating elements upon the rotating cam, without departing from the spirit of the invention, will be obvious to those versed in the art of automatic control. It will also be obvious that the pneumatic device for effecting a regulatory function may be replaced by electrical means as, for example, that fully set forth and described in the hereinbefore mentioned Patent No. 2,000,739.

In practice, the conformed cam member by which the control function is effected would normally take the form of a thin sheet of metal, cut to the desired contour presumably by the superintendent in charge of the operation to be carried out, and at the same time would be equipped with the necessary perforations or projections as the case may be, radially and angularly located in positions for initiating the desired events in the control of the process. The blanks for this purpose would normally be supplied with certain graduations marked upon them corresponding to those upon the conventional circular chart for a graphic instrument to record the variations of the magnitude under control. Any number of such cams could be made up in advance; and upon the starting of a certain process or "cure," the proper cam would be selected and placed upon the instrument, whereupon the complete process would be automatically carried out according to the schedule predetermined by the expert in charge of the work.

The terms and expressions which I have employed are used as terms of description and not of limitation, and I have no intention, in the use of such terms and expressions, of excluding any equivalents of the features shown and described or portions thereof, but recognize that various modifications are possible within the scope of the invention claimed.

I claim:

1. In an instrument for controlling a process cycle involving the coordination of regulation of a variable to a series of magnitudes characterizing said cycle together with the initiation of successive events in a sequence, a cam having its periphery conformed to a contour corresponding to values of said variable and having characteristic elements located thereon in positions corresponding to the timing of said events, follower means adapted to cooperate with said periphery in establishing said values and control means connected to said follower-means for movement therewith, and adapted to cooperate with said elements in initiating said events.

2. In an instrument for controlling a process cycle involving the coordination of regulation of a variable to a series of magnitudes characterizing said cycle together with the initiation of successive events in a sequence, a cam having its periphery conformed to a contour corresponding to values of said variable and having characteristic elements located thereon in positions corresponding to the timing of said events, a follower movable by said cam in accordance with the conformation of said periphery progressively to establish said values independently of said elements, and control means integral with said follower for cooperating with said elements in initiating said events in accordance with the locations of said elements.

3. In an instrument for controlling a process cycle involving the coordination of regulation of a variable to a series of magnitudes characterizing said cycle together with the initiation of successive events in a sequence, a cam having a dimension corresponding to time and another dimension, represented by variations in the contour of said cam, to values of said variable, and having characteristic elements located thereon and spaced in said time dimension according to the required timing of said events, means for driving said cam, a follower movable by said cam in accordance with the conformation of said contour progressively to establish the values of said variable independently of said elements, and means carried by said follower for cooperating with said spaced elements in initiating said events in accordance with the spacing of said elements.

4. In an instrument for controlling a process cycle involving the coordination of regulation of a variable to a series of magnitudes characterizing said cycle together with the initiation of successive events in a sequence, a cam, means for driving said cam at substantially constant speed, said cam having its periphery conformed to a contour corresponding to values of said magnitude and having elements positioned thereon adjacent the periphery thereof and spaced in accordance with the timing of said events, means for regulating said variable, a follower cooperating with said periphery for adjusting said regulator, and means carried by said follower and thereby juxtaposed to said spaced elements for cooperation with the same in initiating said events.

5. In an instrument for controlling a process cycle involving the coordination of regulation of a variable to a series of magnitudes characterizing said cycle together with the initiation of successive events in a sequence, a base, means for regulating the magnitude of said variable, cam means rotatably mounted upon said base and having a periphery conformed to a contour corresponding to a predetermined series of values of said variable, and having elements spaced thereon according to the required timing of said events, means for rotating said cam at substantially constant speed, means comprising an arm pivotally mounted on said base for adjusting said regulating means, said arm being adapted to cooperate with the periphery of said cam means to effect adjustment of said regulating means for establishing predetermined values of said variable, and means connected to said arm for movement therewith and adapted to cooperate with said spaced elements in the initiation of said events at predetermined times.

6. In an instrument for controlling a process cycle involving the coordination of regulation of a variable to a series of magnitudes characterizing said cycle together with the initiation of successive events in a sequence, a base, means for regulating the magnitude of said variable, removable cam means rotatably mounted upon said base and having a periphery conformed to a contour corresponding to a predetermined series of values of said variable, and having elements spaced thereon according to the required timing of said events, means for rotating said cam at substantially constant speed, means comprising an arm pivotally mounted on said base for adjusting said regulating means, said arm being adapted to cooperate with the periphery of said cam means to effect adjustment of said regulating means for establishing predetermined values of said variable, and means connected to said arm for movement therewith and adapted to cooperate with said spaced elements in the initiation of said events at predetermined times.

7. In an instrument for controlling a process cycle involving the coordination of regulation of a variable to a series of magnitudes characterizing said cycle together with the initiation of successive events in a sequence, a base, means for regulating the magnitude of said variable, cam means rotatably mounted upon said base and having a periphery conformed to a contour corresponding to a predetermined series of values of said variable, and having elements spaced thereon according to the required timing of said events, means for rotating said cam at substantially constant speed, means comprising an arm pivotally mounted on said base for adjusting said regulating means, said arm being adapted to cooperate with the periphery of said cam means to effect adjustment of said regulating means for establishing predetermined values of said variable, and means comprising a control element carried by said arm for cooperating with said spaced elements to initiate said events at predetermined times corresponding to the positioning of said spaced elements.

8. In an instrument for controlling a process cycle involving the coordination of regulation of a variable to a series of magnitudes characterizing said cycle together with the initiation of successive events in a sequence, a base, means for regulating the magnitude of said variable, cam means rotatably mounted upon said base and having a periphery conformed to a contour corresponding to a predetermined series of values of said variable, and having elements spaced thereon according to the required timing of said events, means for rotating said cam at substantially constant speed, means comprising an arm pivotally mounted on said base for adjusting said regulating means, said arm being adapted to cooperate with the periphery of said cam means to effect adjustment of said regulating means to establish predetermined values of said variable, and means including a fluid-pressure control element movable with said arm for cooperating with said spaced elements to initiate said events at predetermined times corresponding to the positioning of said spaced elements.

9. In an instrument for controlling a process cycle involving the coordination of regulation of a variable to a series of magnitudes characterizing said cycle together with the initiation of successive events in a sequence, a base, means for regulating the magnitude of said variable, means comprising a fluid-pressure-operated device for initiating said events, cam means rotatably mounted upon said base and having a periphery conformed to a contour corresponding to a predetermined series of values of said variable and having elements spaced thereon according to the required timing of said events, means for rotating said cam at substantially constant speed, means comprising an arm pivotally mounted on said base for adjusting said regulating means, said arm being adapted to cooperate with the periphery of said cam means to be moved to effect adjustment of said regulating means for establishing predetermined values of said variable, and having an orifice member juxtaposed to the body of said cam and adapted to coact therewith in controlling the pressure of a fluid for operating said device and to coact with said elements to modify the pressure of said fluid and thereby to affect the operation of said device.

10. In an instrument for controlling a process cycle involving the coordination of regulation of a variable to a series of magnitudes characterizing said cycle together with the initiation of successive events in a sequence, a base, means for regulating the magnitude of said variable, a fluid-pressure-operated device for initiating said events, cam means rotatably mounted upon said base and having a periphery conformed to a contour corresponding to a predetermined series of values of said variable and including apertures spaced therein according to the required timing of said events, means for rotating said cam at substantially constant speed, means comprising an arm pivotally mounted on said base for adjusting said regulating means, said arm being adapted to cooperate with the periphery of said cam means to be moved to effect adjustment of said regulating means for establishing predetermined values of said variable, and having an orifice member juxtaposed to the body of said cam and adapted to coact therewith in controlling the pressure of a fluid for operating said device and to coact with said apertures to modify the pressure of said fluid and thereby to affect the operation of said device.

11. In an instrument for controlling a process cycle characterized by the coordination of regulation of a variable to a series of magnitudes together with the initiation of successive events in a sequence, means for regulating the magnitude of said variable means for initiating said events, a cam member adapted to be rotated about an axis, and having arcuate dimensions corresponding to time and radial dimensions corresponding to values of said variable, and having its periphery conformed to a curve representing in said dimensions a series of said values with respect to time, and having located upon it, on a curved line substantially equidistant from said periphery, control elements spaced along said line in correspondence to the times of initiation of said events, means for rotating said cam at a substantially constant speed, and means comprising a shiftable cam follower connected to said regulating means and also to said initiating means and adapted to be shifted in accordance with the conformation of said periphery to adjust said regulating means to said series of values, and to coact with said control elements to actuate said initiating means.

12. In an instrument for controlling a process cycle characterized by the coordination of regulation of a variable to a series of magnitudes together with the initiation of successive events in a sequence, means for regulating the magnitude of said variable, means comprising discrete instrumentalities for initiating different events in said cycle, a cam member adapted to be rotated about an axis and having arcuate dimensions corresponding to time and radical dimensions corresponding to values of said variable and having its periphery conformed to a curve representing in said dimensions a series of values with respect to time, and bearing a plurality of groups of control elements arranged upon a plurality of paths substantially parallel to each other and to the periphery, the individual groups on said paths corresponding respectively to individual instrumentalities, and the positioning of the elements of each group along their path representing predetermined times of actuation of the corresponding instrumentality, means for rotating said cam at substantially constant speed, and means comprising a shiftable cam follower connected to said regulating means for adjusting the same, said follower bearing elements individually and operatively associated with said respective instrumentalities, said cam follower being adapted to be shifted in accordance with the conformation of said periphery to adjust said regulating means to a series of values and said last-named elements to coact with said cam-borne elements to actuate said instrumentalities in accordance with the positioning of the elements of each group along their path.

13. In a cycle controller, the combination of a regulator for maintaining the value of a variable at a predetermined magnitude and including means subject to adjustment to vary said magnitude, instrumentalities for initiating and terminating a sequence of conditions, a cam having its periphery conformed to a contour representing a series of values of said variable and having apertures in timed spacing, means for rotating said cam, said adjustable means being adapted to coact with the periphery of said cam for adjustment thereby, and having fluid pressure control elements operatively associated with said instrumentalities and cooperating with said cam means to affect said instrumentalities in one sense and with said apertures to affect said instrumentalities in another sense to carry out the initation and termination of said conditions.

14. In a cycle controller, the combination of a regulator for maintaining the value of a variable at a predetermined magnitude and including means subject to adjustment to vary said magnitude, means controlling the establishing of a sequence of conditions, cyclically operable means coacting with said adjustable means for effecting said adjustment, said cyclically operable means having portions spaced by times corresponding with the occurrence of said conditions, means for actuating said cyclically operable means, and control means carried by said adjustable means operatively associated with said condition controlling means and cooperating with said portions of said cyclically operable means to actuate said condition controlling means in one sense and with other portions of said cyclically operable means to actuate said condition controlling means in another sense to effect initation and termination of said conditions.

15. In an instrument for the control of a process cycle, means for regulating the magnitude of a variable, a continuously operable motor, means driven continuously by said motor for controlling said regulating means to vary said magnitude, according to a predetermined schedule in said cycle, means comprising a plurality of separate elements for initiating successive discrete events in said cycle, a motor intermittently operable for actuating said initiating elements successively, and means controlled by said continuously driven means for bringing the last-mentioned motor into action at predetermined times in said cycle to effect initiating of said events in a predetermined sequence in said cycle.

JAMES R. WAIDELICH.